(12) United States Patent  (10) Patent No.: US 7,571,161 B2
Watson  (45) Date of Patent: Aug. 4, 2009

(54) SYSTEM AND METHOD FOR AUTO-SENSED SEARCH HELP

(75) Inventor: Eric B. Watson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 213 days.

(21) Appl. No.: 11/128,379

(22) Filed: May 13, 2005

(65) Prior Publication Data

US 2006/0259861 A1 Nov. 16, 2006

(51) Int. Cl.
G06F 17/30 (2006.01)
G06F 15/16 (2006.01)

(52) U.S. Cl. .......................... 707/4; 707/104.1; 706/11; 715/705

(58) Field of Classification Search .................. 707/3, 707/5, 6, 104.1; 706/45, 11; 715/705; 705/10
See application file for complete search history.

(56) References Cited

U.S. PATENT DOCUMENTS

| | | | | |
|---|---|---|---|---|
| 6,307,544 | B1 * | 10/2001 | Harding | 715/709 |
| 6,493,703 | B1 * | 12/2002 | Knight et al. | 707/3 |
| 6,542,163 | B2 * | 4/2003 | Gorbet et al. | 715/711 |
| 6,571,216 | B1 * | 5/2003 | Garg et al. | 705/14 |
| 6,578,022 | B1 * | 6/2003 | Foulger et al. | 706/45 |
| 6,647,383 | B1 * | 11/2003 | August et al. | 707/3 |
| 6,732,088 | B1 * | 5/2004 | Glance | 707/3 |
| 6,751,606 | B1 * | 6/2004 | Fries et al. | 707/3 |
| 6,976,019 | B2 * | 12/2005 | Davallou | 707/6 |
| 7,158,966 | B2 * | 1/2007 | Brill et al. | 707/3 |
| 7,165,119 | B2 * | 1/2007 | Fish | 709/246 |
| 2002/0140715 | A1* | 10/2002 | Smet | 345/700 |
| 2003/0009451 | A1* | 1/2003 | Bates et al. | 707/3 |
| 2003/0084034 | A1* | 5/2003 | Fannin | 707/3 |
| 2004/0044585 | A1* | 3/2004 | Franco | 705/26 |
| 2004/0215515 | A1* | 10/2004 | Perry | 705/14 |
| 2005/0216454 | A1* | 9/2005 | Diab et al. | 707/3 |
| 2005/0283468 | A1* | 12/2005 | Kamvar et al. | 707/3 |
| 2006/0064411 | A1* | 3/2006 | Gross et al. | 707/3 |
| 2006/0224579 | A1* | 10/2006 | Zheng | 707/5 |

* cited by examiner

Primary Examiner—Tony Mahmoudi
Assistant Examiner—Dennis Truong
(74) Attorney, Agent, or Firm—Shook, Hardy & Bacon LLP

(57) ABSTRACT

A system and related techniques monitor and manage the delivery of automatic help resources to users engaged in search activity. According to embodiments of the invention, automatic help logic may detect the initiation of search activity. The auto help logic may capture, record and examine user behavior and search data to characterize the search progress or effectiveness experienced by that user. When the auto help logic determines that the user has reached an impasse or experienced ineffective results or progress, the logic may generate and present automatic help. If further user behavior does not predict satisfactory progress, further, graduated or tiered help may be generated and presented. According to embodiments of the invention in a further regard, the user may selectively configure the type or content of automatic help which they wish to receive, or turn that facility on or off on a per-session or longer basis.

19 Claims, 4 Drawing Sheets

SYSTEM AND METHOD FOR AUTO-SENSED SEARCH HELP

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The invention relates to the field of computerized information retrieval, and more particularly to a system and method which intelligently monitors a user's search activity to automatically detect that a user is encountering an impasse or lack of success, and automatically initiate help functionality including alternative search terms, spelling corrections and other assistance.

BACKGROUND OF THE INVENTION

Web-based and other search services today offer users powerful information capabilities. The user interface for search experience has grown in sophistication, including to parse a user's inputted search terms or search results themselves to detect potential misspellings or other input errors. In general many of these search assistance tools are initiated only after discrete events in the search workflow, such as after the user has hit "enter" or otherwise transmitted their search input to a remote server or other location.

However, users performing search activity may encounter difficulties in their search and navigation efforts at any time in their search experience. Sometimes that difficulty may arise at the beginning of a search session, or it may develop after the user has progressed through several layers of search refinement, only to have further progress stymied or interrupted.

The need for query help is moreover often not or not only predicated on correcting typographical errors, but on other higher-level indicators that the user has gotten "off-track" or otherwise reached an impasse, dead end or other unproductive phase in their search activity. Those indicators of an unproductive phase may include search page dwell time, or other time-based or other parameters characterizing the user's search activity. Other problems in search assistance and navigation technology exist.

SUMMARY OF THE INVENTION

The invention overcoming these and other problems in the art relates in one regard to a system and method for automatically sensed search help, in which automatic help logic may detect and monitor a user's search activity to introduce search aids when user difficulty is automatically detected. According to embodiments of the invention in one regard, search activity may be detected by navigation to a known search site or engine, or other triggers. The user's search progress may be monitored by the automatic help logic, which control logic may track a set of indicators reflecting the user's likely search progress or alternatively, lack of progress or search effectiveness. Those indicators may include user behavior or data such as the length of the user's dwell time on a search page or on search results, the number of re-traces through search navigation paths, the number of times a "next page" or other navigation action is taken, the presence of spelling errors or repeated spelling errors, or other parameters or data indicating that the user may not be making satisfactory progress to pertinent search results. According to embodiments of the invention in one regard, the automatic help logic may generate and present a series of graduated or tiered help resources, depending on the user's response and further search progress. The user may therefore be provided with, for instance, a sequence of any one or more of modified spell checking, suggested search refinements, alternative content sources, commercial advertisements, potentially relevant images, video or other media or other search tools or assists, depending on the inferred effectiveness or progress of the user's search activity. According to embodiments of the invention in a further regard, the user may selectively turn on, turn off or configure the automatic search help resources they wish to receive, on a per-session, per-search, permanent or other basis.

DETAILED DESCRIPTION OF EMBODIMENTS

Figure 1:
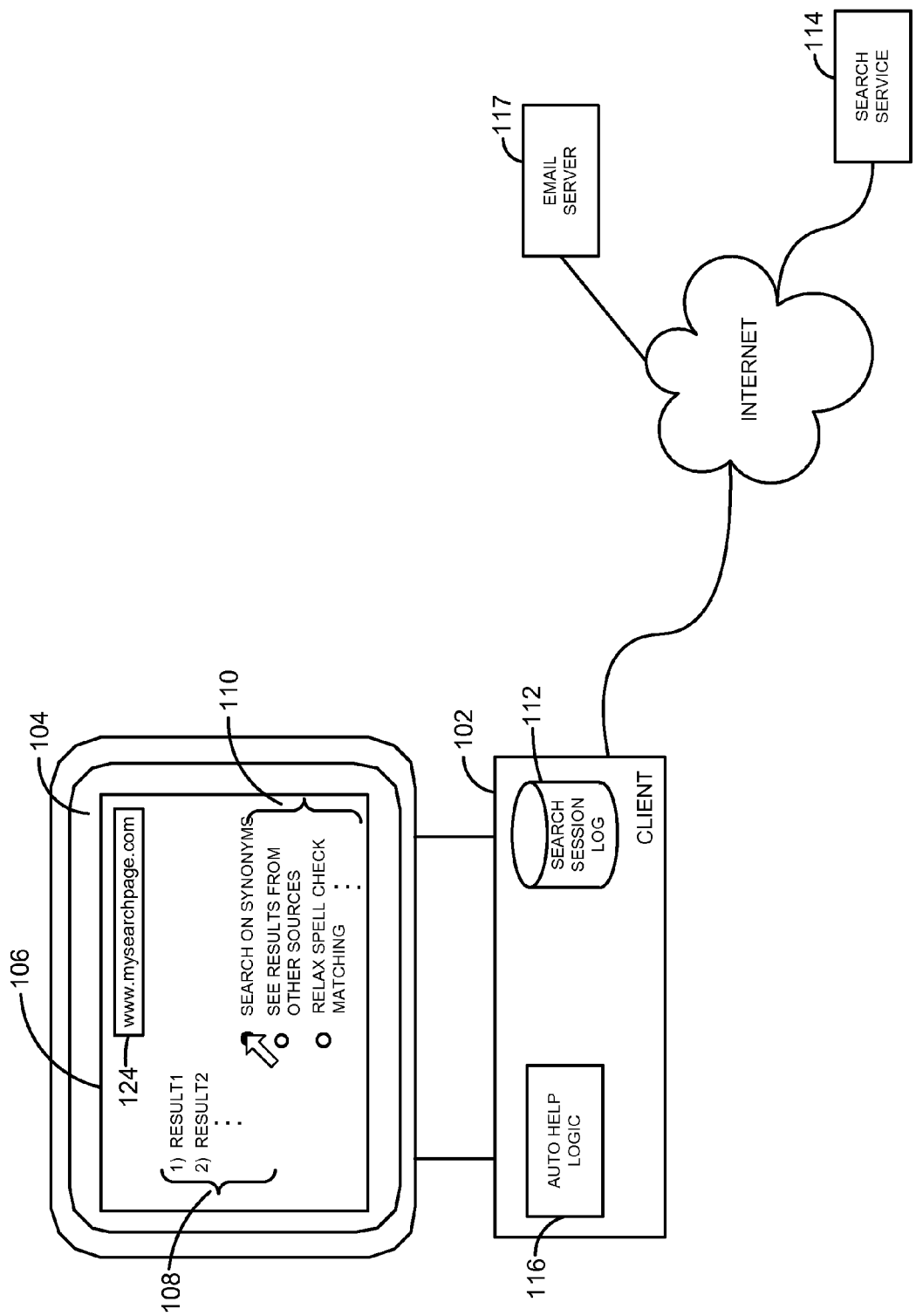
FIG. 1 illustrates an overall environment in which a system and method for automatically sensed search help may operate, according to embodiments of the invention.

FIG. 1 illustrates an environment in which a system and method for automatically sensed search help may operate, according to embodiments of the invention. As illustrated in that figure a user may operate a client 102 such as a desktop or laptop computer, a network-enabled cellular telephone, wireless email client, or other client, machine or device to perform various tasks including search, Web browsing and other tasks, applications and functions. The user may interact with those resources via a user interface 104, such as a graphical user interface, command-line user interface, voice-recognition interface or other interface, for example to navigate to search page 106, such as an Internet or other public or private networked search page. In general the user may supply search input 124 such as typed words or other alphanumeric or other data to conduct a search via a search service 114 (or search an email server 117) to receive a set of search results 108 reflecting content which contains or reflects information related to the search input 124.

According to embodiments of the invention as illustrated in FIG. 1, the user's search activity may be monitored by auto help logic 116, which may for example be hosted in the client 102 or otherwise, to detect periods or points at which the user's search activity has become ineffective or unproductive. More specifically, the auto help logic 116 or other help engine or logic may detect that the user has engaged in a search session by detecting, for instance, that the user has navigated to an Internet search service or other search engine or resource (e.g. email server 117). The auto help logic 116 may capture or access user data and behavior related to that search activity, for instance to identify a set of variables or parameters which may indicate or predict that the user's search activity may have become ineffective or unproductive. For example, the auto help logic 116 may in general capture time-based variables, such as dwell time on search page 106, as well as behavioral data, such as lack of selection of any results within the set of results 108, as well as other data to generate the predictive inference that the user has not located the intended information of interest based on their search input 124.

Auto help logic 116 may in embodiments as illustrated likewise access a search session log 112 which may contain search terms, query refinements and other information captured from current and/or prior search sessions to analyze and predict the user's search patterns, intended results and other predictive or analytic information. In general, upon reaching the predictive inference that the user has reached an ineffective point in their search activity, the auto help logic 116 may generate or present automatic help 110 to the user, for instance as a set of selectable search options or refinements within search page 106, or in other formats.

Figure 2:
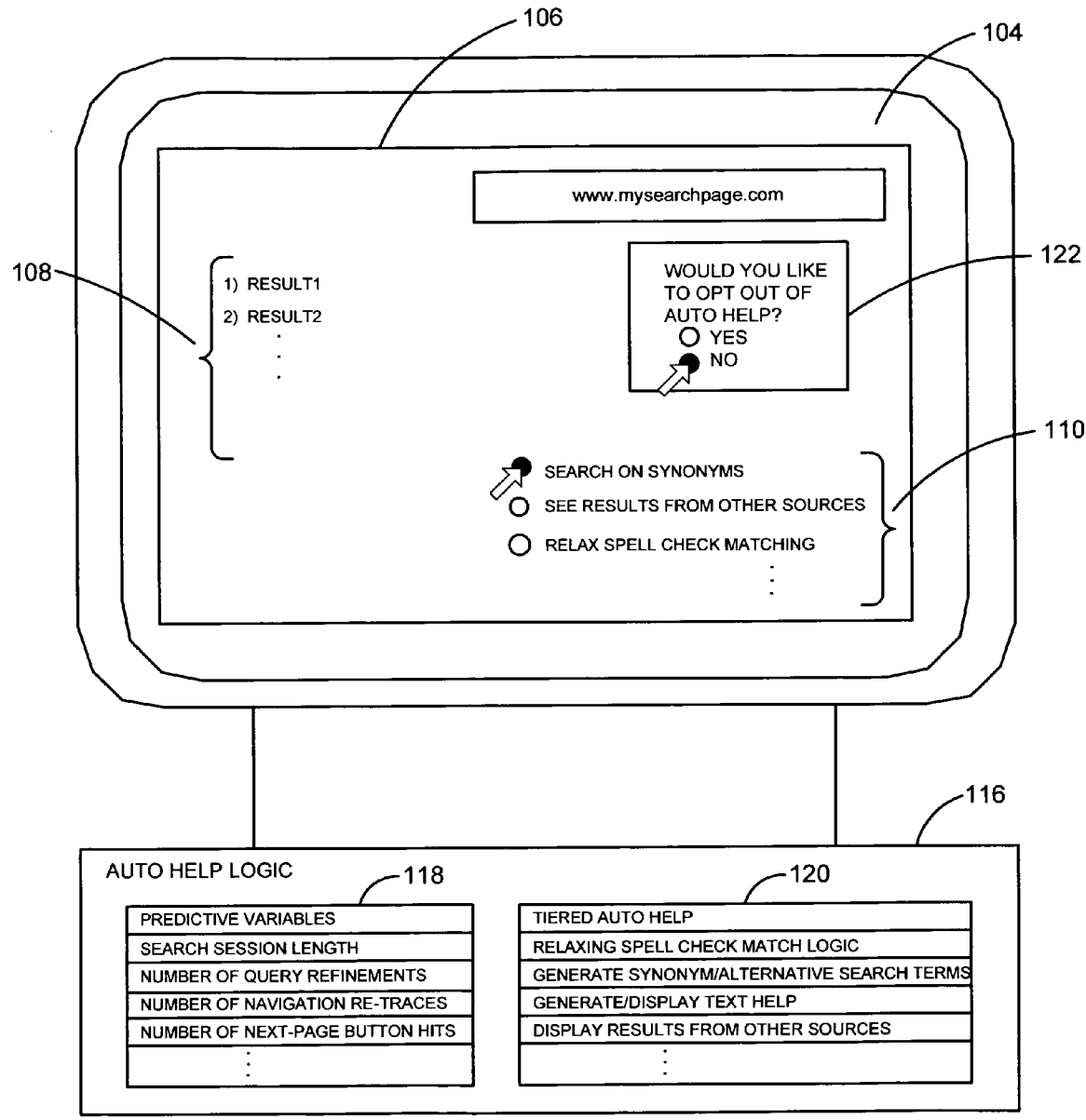
FIG. 2 illustrates an overall environment in which a system and method for automatically sensed search help may operate, according to embodiments of the invention in another regard.

According to embodiments of the invention in one regard, and as for example illustrated in FIG. 2, auto help logic 116 may, include or access a set of predictive variables 118 to assist in the analysis of the user's search effectiveness or ineffectiveness. As illustrated the set of predictive variables 118 may contain a set of time-based, behavior-based and other variables or factors, including search session length, number of query refinements, number of navigation re-traces, the number of "next-page" button hits, or other parameters, actions or behavior. According to embodiments of the invention in one regard, time-based variables may in general indicate a lack of search progress or effectiveness when they reflect longer than typical times associated with search activity. Those typical or average time periods may for example be reflected in the search session log 112, may be collected on an individual or aggregate basis by search service 114, or otherwise derived or recorded. Behavior-related factors in the set of predictive variables 118 may for example include repetitive behavior or actions, or actions reflecting discontinuity in the user's search work flow. Other types, categories and values for predictive variables 118 are possible, and those variables may be extensible through network or other updates.

According to embodiments of the invention, and as likewise illustrated in FIG. 2, the auto help logic 116 may furthermore access or generate tiered auto help 120 as one form or type of automatic help resource, in which in general more than one type or form of help assistance may be generated and presented to the user, in sequence. The sequence or progression of help resources may include, for example, a relaxing of spell checking match logic applied to search input 124 or other data, the generation of synonyms or other alternative or extended search terms, the generation or display of help text, the accessing and display or search results from alternative sources, or other resources, text or actions which may be presented one after the other, in groups of two or more, or in other sequences. According to embodiments of the invention in one regard, the tiered auto help 120 may be successively generated analysis by auto help logic 116 conditioned on the user's perceived search progress, as one or more types of help are delivered and the user continues their search and related activity. According to embodiments of the invention in a further regard, also illustrated in FIG. 2, the auto help logic 116 may furthermore generate and present selectable help options 122, for instance to permit the user to turn automatic help on, off or configure options for that help on a per-search, per-session, permanent or other basis.

Figure 3:
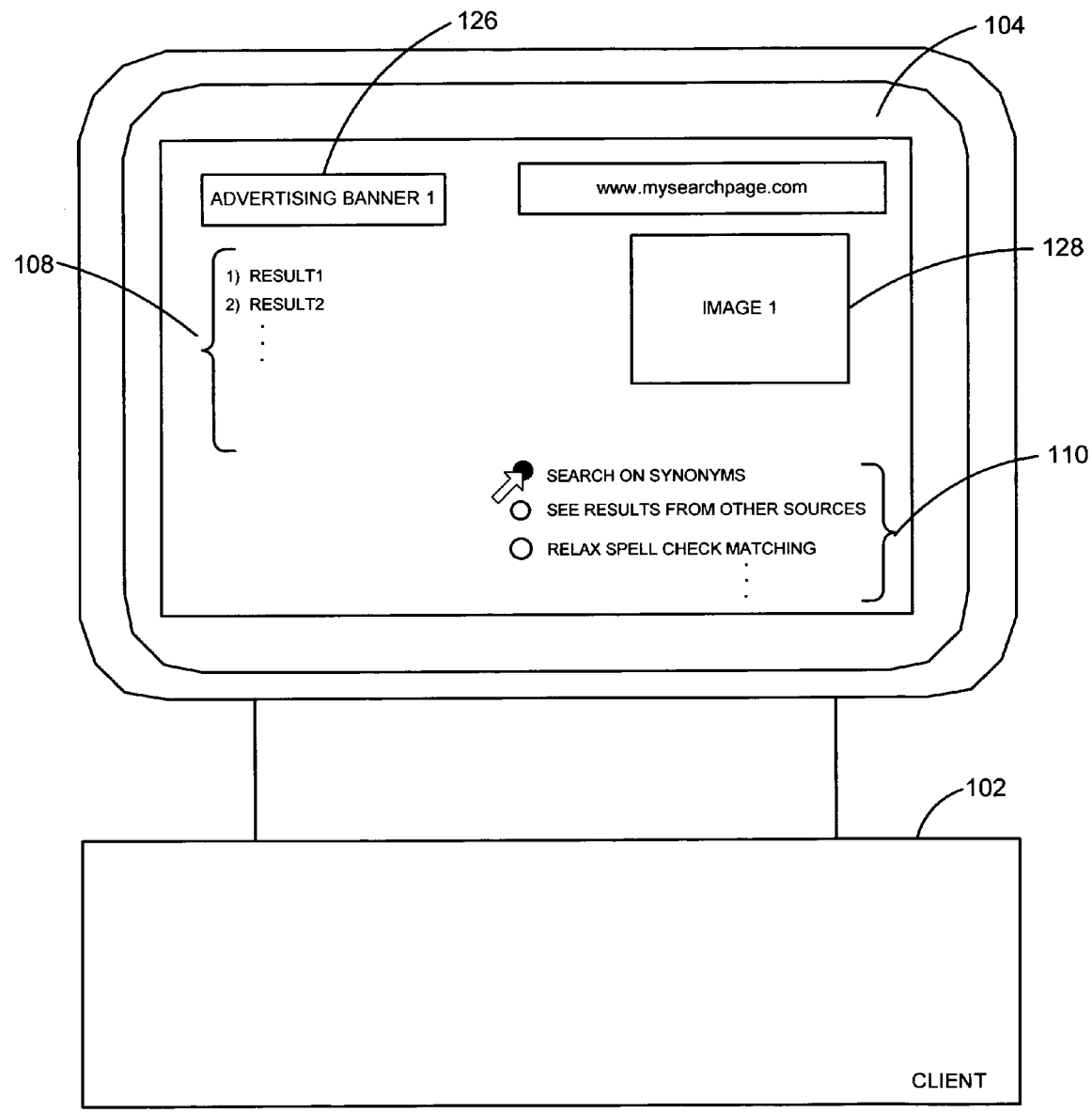
FIG. 3 illustrates an overall environment in which a system and method for automatically sensed search help may operate, according to embodiments of the invention in a further regard.

According to embodiments of the invention in another regard, and as for example illustrated in FIG. 3, when auto help logic 116 is active and tiered auto help 120 options are being applied, the sequence of tiered auto help 120 delivered or presented to the user may include diverse help media or types, including, for example, commercial content 126 such as a banner or streaming media related to the search input 124. The tiered auto help 120 may likewise include image content 128 related to the user's search input 124, for example, image content 128 having file name or metadata related to that input. Other media types, delivery formats and content for tiered auto help 120 are possible.

Figure 4:
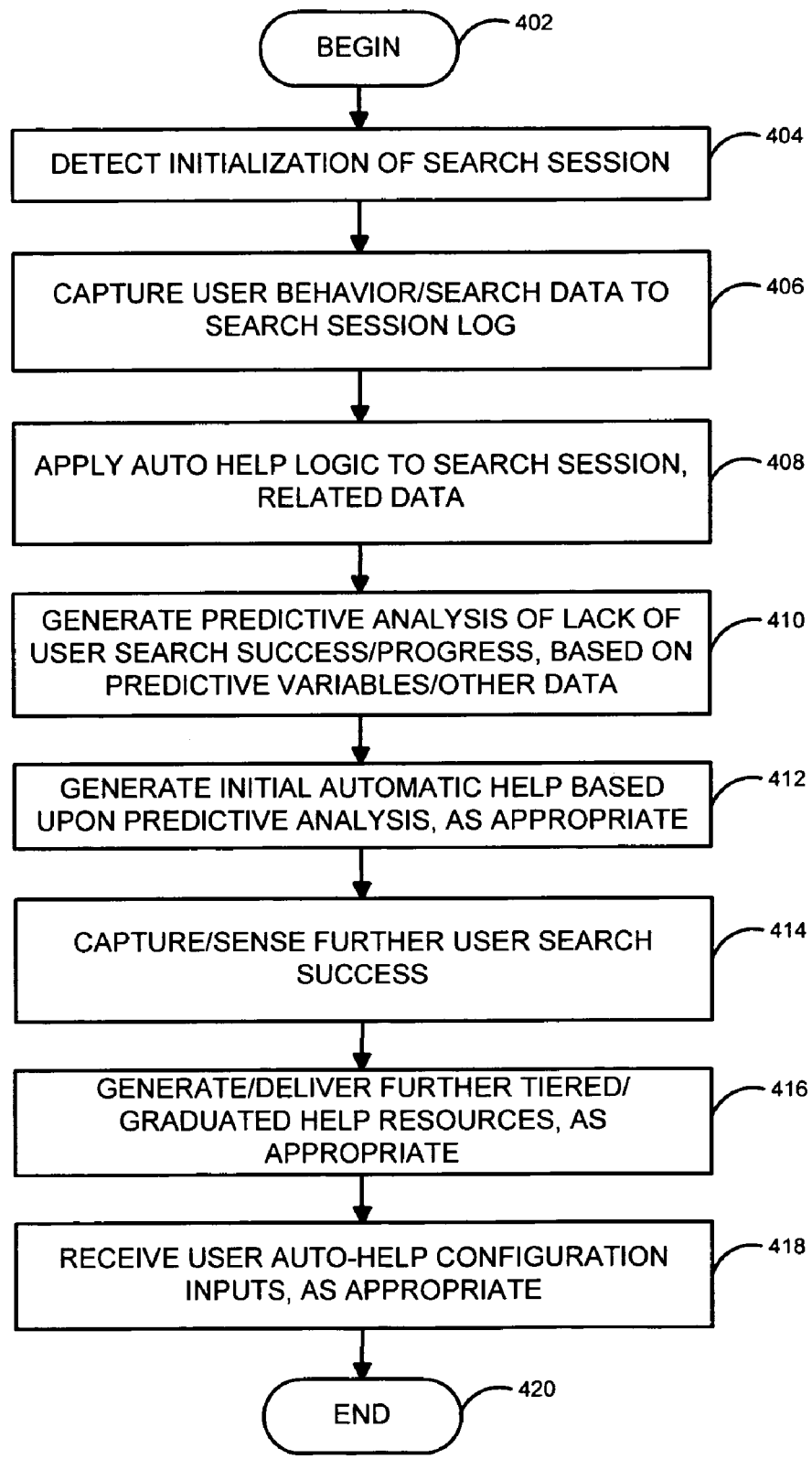
FIG. 4 illustrates a flowchart of overall automatic search help processing, according to embodiments of the invention.

Overall processing of automatically sensed search help is illustrated in FIG. 4, according to embodiments of the invention. In step 402, processing may begin. In step 404, auto help logic 116 or other logic or resources may detect the initiation of a search session, for instance by identifying that a user has navigated to a known search service, Web site or other location. In step 406, the user's current and/or prior search behavior and search data, including for instance search input 124, time recorded at a subject Web site or other location or in other activity, may be captured or accessed. In embodiments that captured information may be stored to search session log 112.

In step 408, auto help logic 116 may apply tests, thresholds or other processing to the search session and related data to characterize the user's search progress or productivity. For example, the auto help logic 116 may examine the dwell time on a Web site or other parameters to characterize the effectiveness of the user's search activity. In step 410, the auto help logic 116 or other logic or resources may generate a predictive analysis of the lack of user search success or effectiveness, for example based on time-based, behavior-based or other predictive variables 118 such as dwell time, number of navigation retraces, the presence or repetition of spelling errors, next-page button hits or other behavior or data. In step 412, initial automatic help 110 may be generated by auto help logic 116 based on that predictive analysis, for instance when a threshold for lack of search effectiveness is reached, or based on other criteria.

The automatic help 110 may be or include, for example, a set of text, images, selectable options and other resources including automatically suggested query refinements or additions, suggested synonyms, or other aid, help or assistance intended to increase the effectiveness of the user's search activity. In step 414, the auto help logic 116 may capture or sense further user search success or effectiveness, for example analyzing further click-through, navigation, search term refinement or other parameters or behavior. In step 416, the auto help logic 116 may generate further or tiered automatic help 120, for example adding or suggesting additional sources for the set of search results 108, adding automatic advertising or streaming media related to the search input 124, or additional or graduated help measures or information.

In step 418, the auto help logic 116 may receive user automatic-help configuration inputs, for example, to turn off automatic help features on a temporary, per-session or permanent basis, to select types or tiers of help to which automatic processing may progress during search sessions, or to alter other automatic help parameters or functions. In step 420, processing may repeat, return to a prior processing point, jump to a further processing point or end.

The foregoing description of the invention is illustrative, and modifications in configuration and implementation will occur to persons skilled in the art. For instance, while the invention has generally been described in terms of a user accessing one search service 114, in embodiments the user may access more than one search service or search engine in conducting their search activity.

Similarly, while the invention has in embodiments been generally described as involving auto help logic 116 which is hosted in client 102, in embodiments that control logic and related resources may be partly or wholly hosted or deployed in other local or remote resources, such as in a remote server or other location. Other hardware, software or other resources described as singular may in embodiments be distributed, and similarly in embodiments resources described as distributed may be combined. The scope of the invention is accordingly intended to be limited only by the following claims.

I claim:

1. A computerized system with a computer-readable medium having computer executable instructions embodied thereon for delivering automatically sensed help resources, comprising:

an input interface to receive predictive variables, wherein the predictive variables include one or more user interactions with a set of search results presented to a user in response to a query submitted by the user; and an automatic help engine, the automatic help engine communicating with the input interface to receive the predictive variables, determining an ineffective point in a search has been reached when a user does not select any search results within the set of search results within a given period of time, wherein the given period of time is determined using past browsing behavior of the user, and wherein the given period of time is greater than a predetermined period of time for the user to select a search result, and automatically delivering a set of help resources upon the determination.

2. A system according to claim 1, wherein the automatic help engine is hosted in at least one of a client and a search service.

3. A method for delivering automatically sensed help resources, comprising:

receiving predictive variables that describe a user's search activity in response to a set of search results presented to a user in response to a query submitted by the user;

determining an ineffective point in a search has been reached when the user does not select any search results within the set of search results within a given period of time, wherein the given period of time is determined using past browsing behavior of the user, and wherein the given period of time is greater than an average period of time the user takes to select a search result; and automatically delivering a set of help resources upon the determination.

4. A method according to claim 3, wherein the set of help resources comprise at least on of text help, query refinement help, spell checking help, commercial content help, image content help and alternative source help.

5. A method according to claim 3, wherein the set of help resources is selectively configurable.

6. A method according to claim 3, wherein the automatically delivering comprises automatically delivering via at least one of a client and a search service.

7. One or more computer-storage media having computer-executable instructions embodied thereon for performing a method of generating a set of automatically sensed help resources, the method comprising:

after at least one set of search results have been presented to a user, receiving predictive variables that describe a user's search activity in response to a set of search results presented to the user in response to a query submitted by the user;

determining an ineffective point in a search has been reached when a next page button has been selected by the user above a threshold number of times without the user selecting any search results within the set of search results, wherein the threshold number of times is based on the past browsing behavior of the user, wherein the threshold number of times is greater than an average number of times the user selects the next page button prior to selecting a search result, and wherein selecting the next page button shows a next page of search results; and automatically delivering a set of help resources upon the determination that an ineffective point in a search has been reached based on the predictive variables.

8. A set of automatically sensed help resources according to claim 7, wherein the set of help resources comprises at least one of text help, query refinement help, spell checking help, commercial content help, image content help and alternative source help.

9. A set of automatically sensed help resources according to claim 7, wherein the set of help resources is selectively configurable.

10. A system according to claim 1, wherein the automatic help engine determines the user has engaged in a search by detecting that the user is viewing an Internet search service.

11. A method according to claim 3, further comprising determining that the user has engaged in a search by detecting that the user is viewing an Internet search service.

12. A set of automatically sensed help resources according to claim 7, wherein the method further comprises determining the user has engaged in a search by detecting that the user is viewing an Internet search service.

13. A system according to claim 1, wherein determining an ineffective point in the search has been reached includes detecting that a next page button has been selected by the user above a threshold number of times, wherein selecting the next page button shows a next page of search results.

14. A method according to claim 3, wherein determining an ineffective point in a search has been reached includes detecting that a next page button has been selected by the user above a threshold number of times, wherein selecting the next page button shows a next page of search results.

15. A system according to claim 1, wherein the automatic help engine records user search behavior and search data in a data store.

16. A system according to claim 1, wherein the automatic help engine retrieves the user search behavior and the search data from the data to determine the user did not select any results within the set of search results presented to the user in response to the query within the given period of time.

17. A method according to claim 3, further comprising recording user search behavior and search data in a data store.

18. A set of automatically sensed help resources according to claim 7, further comprising recording user search behavior and search data in a data store.

19. A system according to claim 1, wherein the set of help resources comprises at least one of text help, query refinement help, spell checking help, commercial content help, image content help and alternative source help.

* * * * *